United States Patent
Apte et al.

(10) Patent No.: US 7,996,830 B2
(45) Date of Patent: Aug. 9, 2011

(54) PROGRAMMING MODEL GENERIC APPLICATION DEPLOYMENT

(75) Inventors: Ajay A. Apte, Austin, TX (US); Fong-Meng L. L. Chan, Austin, TX (US); Truong-An H. Thai, Pflugerville, TX (US); Brian Tsai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 11/422,253

(22) Filed: Jun. 5, 2006

(65) Prior Publication Data
US 2007/0283344 A1    Dec. 6, 2007

(51) Int. Cl.
   G06F 9/44    (2006.01)
   G06F 9/445   (2006.01)
(52) U.S. Cl. .................... 717/174; 717/168
(58) Field of Classification Search .............. None
   See application file for complete search history.

(56) References Cited

U.S. PATENT DOCUMENTS

| | | | |
|---|---|---|---|
| 5,933,646 A * | 8/1999 | Hendrickson et al. | 717/169 |
| 6,615,405 B1 * | 9/2003 | Goldman et al. | 717/174 |
| 6,718,546 B1 * | 4/2004 | Johnson | 717/169 |
| 6,865,737 B1 * | 3/2005 | Lucas et al. | 717/178 |
| 7,089,553 B1 * | 8/2006 | Glaser et al. | 717/178 |
| 7,254,814 B1 * | 8/2007 | Cormier et al. | 718/106 |
| 7,424,717 B2 * | 9/2008 | Blevins | 719/318 |
| 7,506,337 B2 * | 3/2009 | Iyer | 717/177 |
| 7,853,945 B2 * | 12/2010 | Kramer et al. | 717/174 |
| 2005/0160420 A1 * | 7/2005 | Kruta et al. | 717/174 |
| 2005/0223375 A1 * | 10/2005 | Duggan et al. | 717/173 |
| 2007/0234345 A1 * | 10/2007 | Kramer et al. | 717/174 |
| 2007/0282801 A1 * | 12/2007 | Apte et al. | 707/3 |

OTHER PUBLICATIONS

Chris Luer and Andre van der Hoek, Composition Environments for Deployable Software Components [online], Aug. 22, 2002 [retrieved on Mar. 22, 2011], pp. 1-54. Retrieved from the Internet: <URL: http://www.ics.uci.edu/~andre/papers/T7.pdf>.*

Nikola Bogunovic, A Programming Model for Composing Data-Flow Collaborative Applications [retrieved on Mar. 15, 2011], pp. 1-7. Retrieved from the Internet: <URL: http://ieeexplore.ieee.org/stamp/stamp.jsp?tp=&arnumber=755868>.*

* cited by examiner

Primary Examiner — Thuy Dao
Assistant Examiner — Hanh T Bui
(74) Attorney, Agent, or Firm — DeLizio Gilliam, PLLC

(57) ABSTRACT

Methods, systems, and computer program products are provided for deploying an application. Embodiments include receiving a packaged application for deployment and an instruction to perform a deployment management operation; selecting in dependence upon plug-in selection rules one of a plurality of configuration plug-ins for creating a deployable object from the packaged application; receiving from the selected configuration plug-in a deployable object; querying one or more of the plurality of configuration plug-ins with the deployable object for identifications of configuration attributes needed to perform the deployment management operation; receiving from each of the queried configuration plug-ins identifications of configuration attributes needed to deploy the deployable object; presenting the identifications of configuration attributes needed to deploy the deployable object to a user; receiving from the user the configuration attributes needed to deploy the deployable object; and storing the deployable object and the configuration attributes.

18 Claims, 4 Drawing Sheets

US 7,996,830 B2

PROGRAMMING MODEL GENERIC APPLICATION DEPLOYMENT

BACKGROUND OF THE INVENTION

1. Field of the Invention

The field of the invention is data processing, or, more specifically, methods, systems, and products for deploying an application.

2. Description of Related Art

Deploying an application is the process of installing the executable code in the runtime environment. Deployment often involves making the code available to the server, resolving resource references in the application with the resources actually available on the server, and providing other configuration information to the application such that the application may be executed in the runtime environment. Managing an application lifecycle typically involves executing one or more management operations. Typical management operations generally include operations for installing the application on the server, configuring the application in the server environment, uninstalling the application, updating the application for patches or scheduled maintenance, exporting the deployed application to be imported back into a development environment and other deployment management operations that will occur to those of skill in the art. The application deployment operations and requirements upon a user to execute them are typically complex and are often tied closely to the programming model of the application and run-time server. As such, application management logic written for specific programming models often cannot be reused or easily extended to support other programming models supported by application servers. Application servers, however, are evolving to support more than one programming model. There is an ongoing need for improvement in deploying applications that is programming model generic.

SUMMARY OF THE INVENTION

Methods, systems, and computer program products are provided for deploying an application according to the present invention. Embodiments include receiving a packaged application for deployment and an instruction to perform a deployment management operation; selecting in dependence upon plug-in selection rules one of a plurality of configuration plug-ins for creating a deployable object from the packaged application; receiving from the selected configuration plug-in a deployable object; querying one or more of the plurality of configuration plug-ins with the deployable object for identifications of configuration attributes needed to perform the deployment management operation; receiving from each of the queried configuration plug-ins identifications of configuration attributes needed to deploy the deployable object; presenting the identifications of configuration attributes needed to deploy the deployable object to a user; receiving from the user the configuration attributes needed to deploy the deployable object; and storing the deployable object and the configuration attributes.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
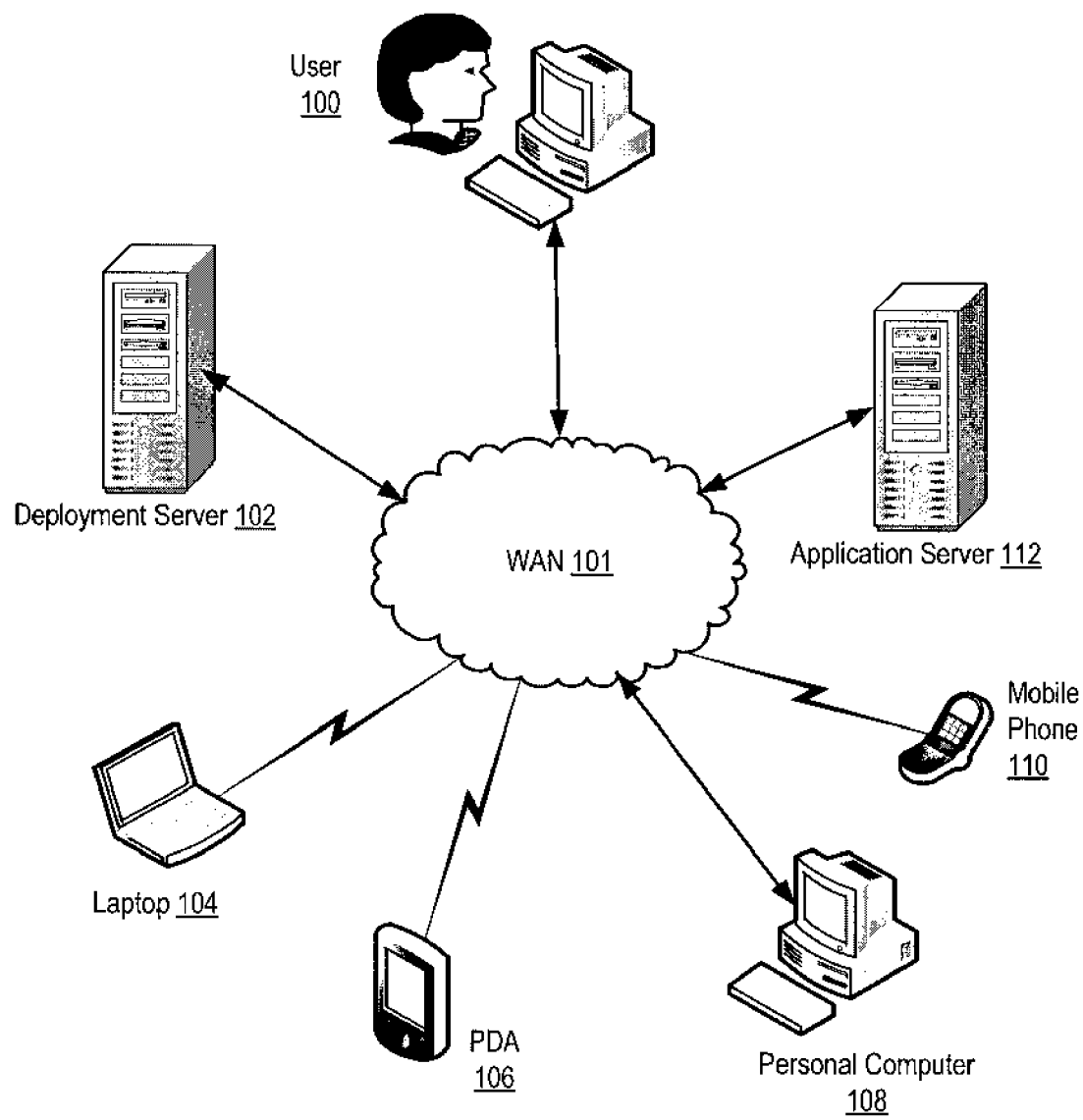
FIG. 1 sets forth a network diagram illustrating an exemplary system for deploying an application according to embodiments of the present invention.

Exemplary methods, systems, and products for deploying an application according to embodiments of the present invention are described with reference to the accompanying drawings, beginning with FIG. 1. FIG. 1 sets forth a network diagram illustrating an exemplary system for deploying an application according to embodiments of the present invention. The system of FIG. 1 operates generally to deploy an application according to embodiments of the present invention by receiving a packaged application for deployment and an instruction to perform a deployment management operation; selecting in dependence upon plug-in selection rules one of a plurality of configuration plug-ins for creating deployable objects from the packaged application; receiving from the selected configuration plug-in the deployable objects; querying one or more of the plurality of configuration plug-ins with the deployable objects for identifications of configuration attributes needed to perform the deployment management operation; receiving from each of the queried configuration plug-ins identifications of configuration attributes needed to deploy each of the deployable objects; presenting the identifications of configuration attributes needed to deploy the deployable objects to a user; receiving from the user the configuration attributes needed to deploy the deployable objects; and storing the deployable objects and the configuration attributes.

The system of FIG. 1 includes a deployment server (102) for deploying an application according to the present invention. An application is software such as business application or web application to be deployed to an application server and run on the application server (112). In the example of FIG. 1, the application deployed and running on the application server (112) provides services accessible to users through a wide area network ('WAN') (101) through client applications running on one or more of the client devices such as the laptop (104), the personal digital assistant ('PDA') (106), the personal computer (108), and the mobile phone (110).

The deployment server (102) of FIG. 1 has installed up in a deployment package capable of deploying an application according to the present invention by receiving a packaged application for deployment and an instruction to perform a deployment management operation; selecting in dependence upon plug-in selection rules one of a plurality of configuration plug-ins for creating deployable objects from the packaged application; receiving from each selected configuration plug-in a deployable object; querying one or more of the plurality of configuration plug-ins with each deployable object for identifications of configuration attributes needed to perform the deployment management operation; receiving from each of the queried configuration plug-ins identifications of configuration attributes needed to deploy each deployable object; presenting the identifications of configuration attributes needed to deploy each deployable object to a user; receiving from the user the configuration attributes needed to deploy the deployable objects; and storing the deployable objects and configuration attributes on the application server (112).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Deploying an application in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary deployment server (152) useful in deploying an application according to embodiments of the present invention. The deployment server (152) of FIG. 2 includes at least one computer processor (156) or 'CPU' as well as random access memory (168) ('RAM') which is connected through a system bus (160) to processor (156) and to other components of the deployment server.

Figure 2:
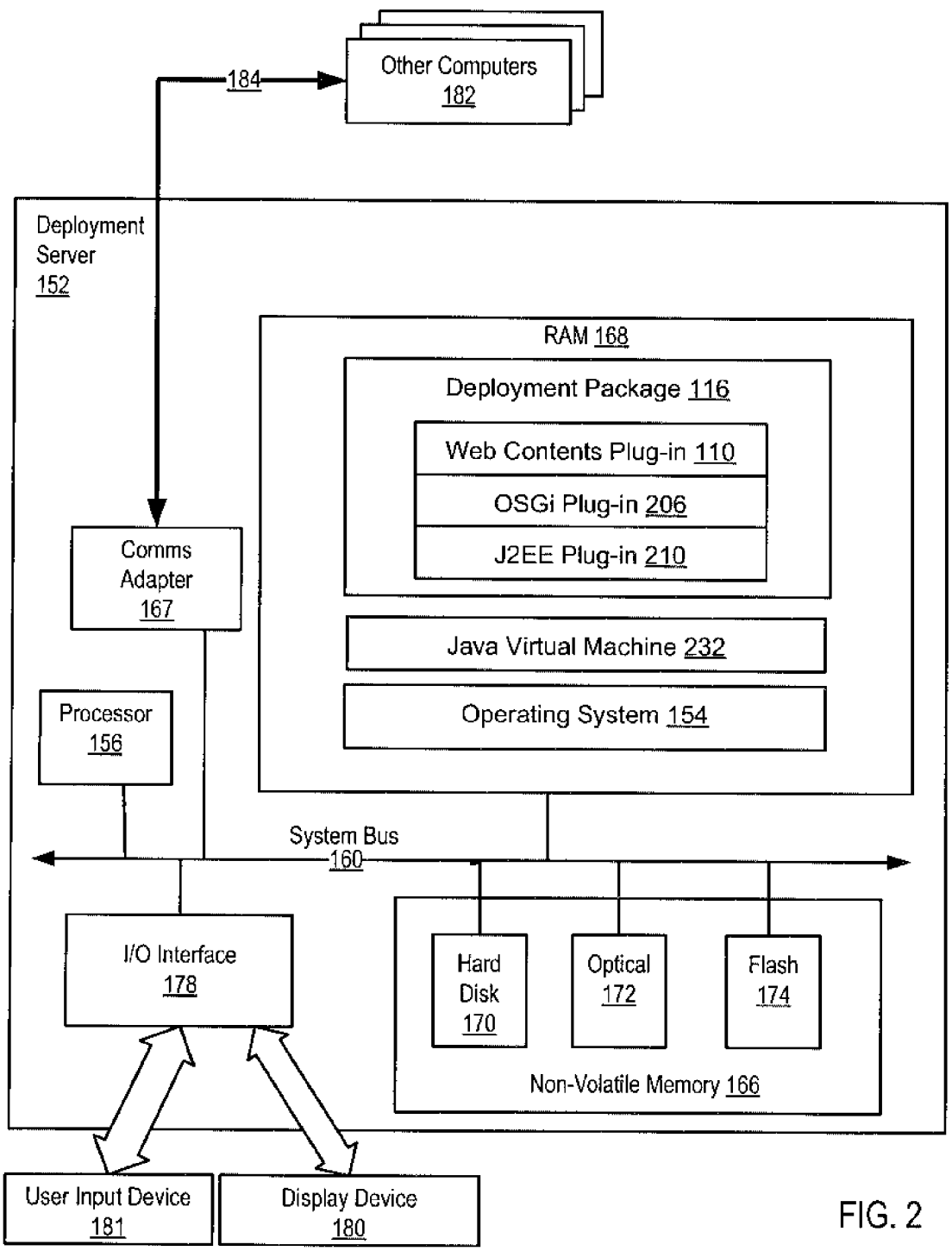
FIG. 2 sets forth a block diagram of automated computing machinery comprising an exemplary deployment server useful in deploying an application according to embodiments of the present invention.

Stored in RAM (168) is a deployment package (116), computer program instructions for deploying an application according to the present invention. The deployment package (116) of FIG. 2 is capable of receiving a packaged application for deployment and an instruction to perform a deployment management operation; selecting in dependence upon plug-in selection rules one or more of a plurality of configuration plug-ins (110, 206, 210) for creating one or more deployable objects from the packaged application; receiving from each selected configuration plug-in a deployable object; querying one or more of the plurality of configuration plug-ins (110, 206, 210) with each deployable object for identifications of configuration attributes needed to perform the deployment management operation; receiving from each of the queried configuration plug-ins (110, 206, 210) identifications of configuration attributes needed to deploy each of the deployable objects; presenting the identifications of configuration attributes needed to deploy each deployable object to a user; receiving from the user the configuration attributes needed to deploy each of the deployable objects; and storing the deployable objects and the configuration attributes. The deployment module of FIG. 2 receives identifications of specific configuration attributes from type specific plug-ins allowing the deployment module to be programming model generic.

Also stored RAM (168) are three type specific plug-ins: a web contents plug-in (110), an OSGi plug-in (110), and a J2EE plug-in (210). The web contents plug-in (110) of FIG. 2 is capable of creating a deployable object if selected by the deployment package (116) and capable of identifying identifications of configuration attributes needed to deploy the web contents in the application to be deployed.

The example of FIG. 2 includes an OSGi plug-in (206). The OSGi plug-in (206) of FIG. 2 is capable of creating a deployable object if selected by the deployment package (116) and capable of identifying identifications of configuration attributes needed to deploy the OSGi components or modules in the application to be deployed. "OSGi" refers to the Open Service Gateway initiative, an industry organization developing specifications delivery of service bundles, software middleware providing compliant data communications and services through services gateways. The OSGi specification is a Java based application layer framework that gives service providers, network operator device makers, and appliance manufacturer's vendor neutral application and device layer APIs and functions. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

The example of FIG. 2 includes a J2EE plug-in (210). The J2EE plug-in (210) of FIG. 2 is capable of creating a deployable object if selected by the deployment package (116) and capable of identifying identifications of configuration attributes needed to deploy the J2EE components or modules in the application to be deployed. 'J2EE' refers to the Java 2 Platform Enterprise Edition that defines a standard for developing applications. The J2EE standard framework provides support for a number of distributed computer technologies and services.

The example of FIG. 2 includes a web contents plug-in (110), an OSGi plug in (206), and a J2EE plug-in (210) for explanation and not for limitation. In fact, any number of type specific configuration plug-ins may be used for deploying applications according to the present invention and all such type-specific plug-ins are well within the scope of the present invention.

Also stored in RAM (168) is a Java Virtual Machine ('JVM') (232). A JVM is a platform-independent execution environment that converts Java bytecode into machine language and executes it.

Also stored in RAM (168) is an operating system (154). Operating systems useful in deployment servers according to embodiments of the present invention include UNIX™, Linux™, Microsoft XP™, AIX™, IBM's i5/OS™, and others as will occur to those of skill in the art. Operating system (154), deployment module (116), web contents plug-in (110), OSGi plug-in (206), and J2EE plug-in (210) in the example of FIG. 2 are shown in RAM (168), but many components of such software typically are stored in non-volatile memory (166) also.

Deployment server (152) of FIG. 2 includes non-volatile computer memory (166) coupled through a system bus (160) to processor (156) and to other components of the deployment server (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example deployment server of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary deployment server (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for deploying applications according to embodiments of the present invention include modems for wired dial-up communications, Ethernet (IEEE 802.3) adapters for wired network communications, and 802.11b adapters for wireless network communications.

Figure 3:
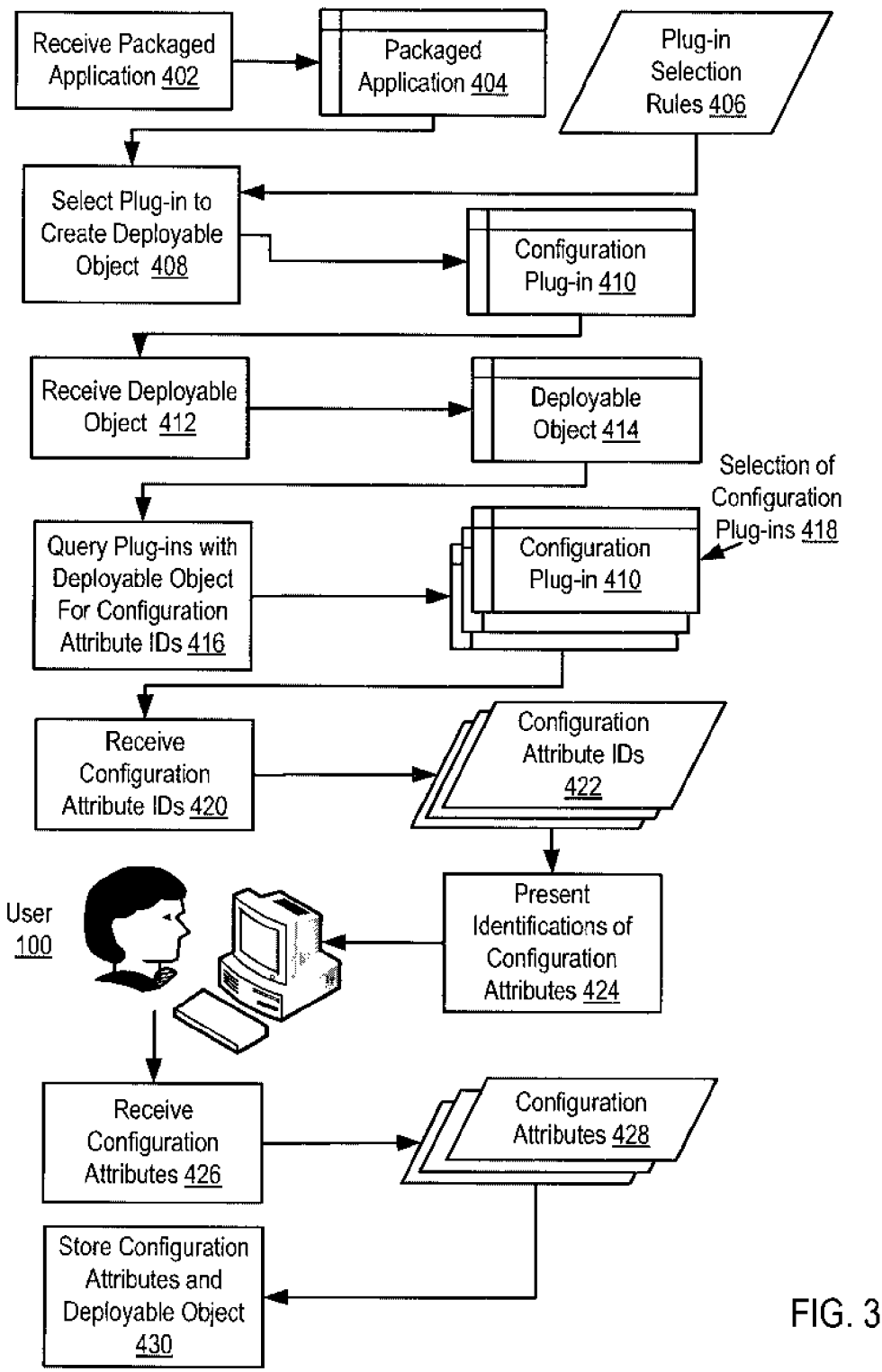
FIG. 3 sets forth a flow chart illustrating an exemplary computer-implemented method for deploying an application according to embodiments of the present invention that includes receiving a packaged application for deployment.

For further explanation, FIG. 3 sets forth a flow chart illustrating an exemplary computer-implemented method for deploying an application according to embodiments of the present invention that includes receiving (402) a packaged application (404) for deployment. A packaged application (404) for deployment is a collection of one or more modules which collectively contain the components of an application to be deployed. In the J2EE programming model, for example, an enterprise application archive, or ('EAR') file, includes a set of modules collectively containing all of the components of an application. The EAR file also contains a deployment descriptor, which specifies the modules that the EAR file contains and other application-wide configuration details.

The packaged application is typically also accompanied by an instruction to perform a deployment management operation. Deployment management operations are defined operations for deploying an application. That is, defined operations for making an application ready to be started in a runtime environment. The specific deployment management operations themselves are often programming model specific. Deployment management operations in the J2EE programming model, for example, include 'install,' 'uninstall,' 'update,' and so on as will occur to those of skill in the art. Deployment management operations in the OSGi programming model, for example, include 'install,' 'upgrade,' 'remove,' and so on as will occur to those of skill in the art. As discussed above, deploying an application according to embodiments of the present invention is programming-model independent and therefore, the instruction to perform a deployment management operation may be an instruction in one of many programming-models that a deployment module of the present invention is designed to support.

The method of FIG. 3 also includes selecting (408) in dependence upon plug-in selection rules (406) one of a plurality of configuration plug-ins (410) for creating a deployable object from the packaged application (404). A configuration plug-in is a type-specific plug-in capable of creating a deployable object for the application contents to be deployed and identifying attributes needed for deployment of one or more type-specific modules of the application. The configuration plug-in is often programming-model-type specific. For example, consider deploying an application having both modules conforming to the J2EE programming model and the OSGi programming model. An OSGi configuration plug-in in accordance with the present invention is capable of creating a deployable object for contents of the application conforming to OSGi programming model, and also capable of identifying configuration attributes needed for deploying the modules of the web application conforming to the OSGi programming model.

A deployable object is a realization of an abstract class representing the contents of the deployable application that is to be deployed in a run-time environment on an application server platform. The deployable object is an abstraction representing the data consisting of the deployable contents of the web application, as well as the operations capable of being invoked on the data in the deployable contents of the application. The deployable object typically implements a well-defined interface for accessing the deployable contents of the web application. Examples of such functions include 'open' for opening deployable contents in the web application, 'close' for closing deployable contents in the application, 'read' for reading contents in the application, 'write' for writing contents in the application, 'save' for saving contents in the application, and so on as will occur to those of skill in the art.

Creating a deployable object may be carried out by factory methods in the selected configuration plug-in. A factory method is a one of the object-oriented design patterns for creating objects. Like other creational patterns, the factory method pattern typically creates objects without specifying the exact class of object that will be created by defining a separate method for creating the objects, in which subclasses can then override to specify the derived type of object that will be created. More generally, the term factory method is often used to refer to any method whose main purpose is to create objects and such a broad definition is applicable here as well. Factory methods useful in creating a deployable object according to the present invention may be implemented as a defined interface that receives identifications of deployable contents in the application and creates a deployable object representing the deployable contents in the application.

As discussed above, configuration plug-ins are often designed as specific type configuration plug-ins designed to identify configuration attributes needed for deploying modules of their type in the application. Such configuration plug-ins may also be of a type that inherits attributes from a parent type in a hierarchical type structure. For example, a specific web application archive ('WAR') plug-in may be child of a more generic J2EE plug-in. In such hierarchical type structures, selecting (408) in dependence upon plug-in selection rules (406) one of a plurality of configuration plug-ins (410) for creating a deployable object (414) from the packaged application may be carried out by selecting a configuration plug-in in dependence upon the hierarchical relationship between the selected plug-in and one of the other plug-ins.

Hierarchical relationships among plug-ins allow for the extension of deployment modules according to the present invention as new programming models emerge. That is, later developed plug-ins of later developed programming models may be designed as children to earlier developed plug-ins designed for earlier developed programming models. The later developed plug-ins are designed to accept deployable objects created by earlier developed generic parents and also identify configuration attributes need to deploy the application as defined by that later developed programming model.

Figure 4:
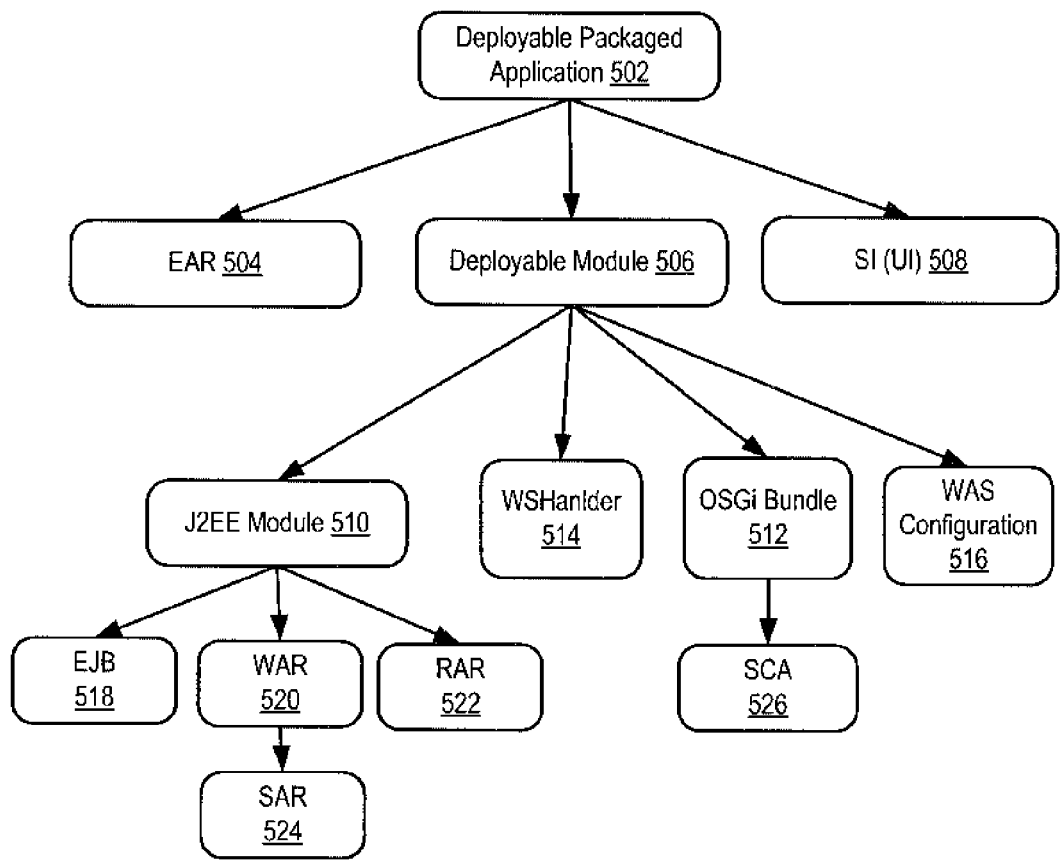
FIG. 4 sets forth a block diagram of an exemplary hierarchical relationship of configuration plug-ins useful in deploying applications according to the present invention.

For further explanation, FIG. 4 sets forth a block diagram of an exemplary hierarchical relationship of configuration plug-ins useful in deploying applications according to the present invention. The example of FIG. 4 includes a deployable package (502) plug-in. The deployable packaged application represents the application to be deployed.

The example of FIG. 4 includes an EAR file plug-in (504), which is a child of the deployable packaged application (502). As discussed above, an EAR file is an enterprise application archive file containing the modules of a deployable application. The EAR file plug-in is capable of creating a deployable object and identifying in the application any EAR file specific configuration parameters needed to perform a particular deployment management function.

The example of FIG. 4 also includes a Solution Install plug-in (508), which is an application packaging standard and which is also a child of the deployable packaged application. The Solution Install plug-in is capable of creating a deployable object and identifying in the application any specific configuration parameters needed to perform a particular deployment management function.

The example of FIG. 4 also includes a deployable module plug-in (506), which is a child of the deployable packaged application (502). A deployable module is a collection of components of the same general type and often to be run inside a corresponding container of the same type. The deployable module plug-in is capable of creating a deployable object and identifying in the application any deployable module specific configuration parameters need to perform a particular deployment management function.

The example of FIG. 4 includes a J2EE module plug-in (510), which is a child of the deployable module (506) and has three children (518, 520, and 522) that are type specific plug-ins conforming to the J2EE programming model, but also implementing type specific aspects of the J2EE programming model. The J2EE Module plug-in is capable of creating a deployable object and identifying in the application any J2EE specific configuration parameters needed to perform a particular deployment management function.

The first child of the J2EE module plug-in of FIG. 4 includes an Enterprise Java Bean ('EJB') plug-in (518). The Enterprise JavaBeans specification is one of the several Java APIs in the Java 2 Platform, Enterprise Edition. The specification details how an application server provides server-side objects known as Enterprise JavaBeans, or EJBs. The EJB plug-in is capable of creating a deployable object and identifying in the application any EJB specific configuration parameters needed to perform a particular deployment management function.

The second child of the J2EE module plug-in (510) in example of FIG. 4 includes a Web archive ('WAR') file plug-in (520). A Web archive (WAR) file is a packaged web application. WAR files can be used to import a web application into a web server. The WAR file plug-in is capable of creating a deployable object and identifying in the application any WAR file specific configuration parameters needed to perform a particular deployment management function.

The WAR file plug-in (520) of FIG. 4 also has a child which is a SAR file plug-in (524). A SAR file is a 'Servlet Initiation Protocol' ('SIP') archive, another J2EE standard. The SAR file plug-in is capable of creating a deployable object and identifying in the application any SIP-specific configuration parameters needed to perform a particular deployment management function.

The third child of the J2EE module plug-in (510) in example of FIG. 4 includes a RAR file plug-in (522). The RAR file is a packaged connector module as defined in J2EE specification that allows connectivity to data storage. The RAR file plug-in is capable of creating a deployable object and identifying in the application any RAR file specific configuration parameters needed to perform a particular deployment management function.

The deployable module plug-in (506) in the example of example of FIG. 4 also includes a child WSHandler plug-in (514). A WSHandler is a generic handler class that generates code to call a Web Service. The WSHandler plug-in is capable of creating a deployable object and identifying in the application any WSHandler specific configuration parameters needed to perform a particular deployment management function.

The deployable module plug-in (506) in the example of example of FIG. 4 also includes a child, the OSGi bundle plug-in (512). As discussed above, OSGi is Java programming language based service platform that can be remotely managed. The OSGi specification includes a framework that defines an application life cycle model and a service registry. The OSGi plug-in is capable of creating a deployable object and identifying in the application any OSGi specific configuration parameters needed to perform a particular deployment management function.

The OSGi bundle plug-in (512) of FIG. 4 includes a child Service Component Architecture ('SCA') plug-in (526). SCA provides a model for implementing IT services defined in terms of a business function, and do not unnecessarily expose the programmer to the complexity of traditional middleware programming. The SCA plug-in is capable of creating a deployable object and identifying in the application any SCA specific configuration parameters needed to perform a particular deployment management function.

The deployable module plug-in (506) in the example of example of FIG. 4 also includes a child WebSphere Application Server ('WAS') configuration plug-in (516). WebSphere application server is an IBM software product that provides the core software needed to deploy, integrate and manage e-business applications. The WAS Configuration plug-in is capable of creating a deployable object and identifying in the application any WAS configuration specific configuration parameters needed to perform a particular deployment management function.

As mentioned above, providing a hierarchical relationship of plug-ins provides a vehicle for selecting a plug-in for creating a deployable object according to the present invention. Because programming models evolve the child plug-ins are designed to provide configuration parameters needed to deploy the application and also are designed to operate with deployable objects created by their parents. In the example of FIG. 4, for instance, the SAR plug-in (524) is designed to identify SAR specific configuration parameters needed to deploy the application and is also designed to accept a deployable object created by the J2EE module (510) its grandparent.

In such hierarchical type structures such as the example of FIG. 4, selecting in dependence upon plug-in selection rules one of a plurality of configuration plug-ins for creating a deployable object from the packaged application may be carried out by selecting a configuration plug-in in dependence upon the hierarchical relationship between the selected plug-in and one of the other plug-ins. For further explanation, consider the following plug-in selection rule:

IF children include EJB plug-in, WAR plug-in, or RAR plug-in, AND
IF parent include J2EE plug-in,
THEN
select J2EE plug-in to create deployable object.

In the exemplary plug-in selection rule above, if the hierarchal representations of the plug-ins include children plug-ins identified as either EJB plug-in, WAR plug-in, or RAR plug-in, and if their parent is a J2EE plug-in then the rule dictates that the J2EE plug-in is selected for creating the deployable object in accordance with the present invention.

Returning to FIG. 3: After selecting (408) in dependence upon plug-in selection rules (406) one of a plurality of configuration plug-ins (410) for creating a deployable object from the packaged application (404) the method of FIG. 3 continues by receiving (412) from the selected configuration plug-in (410) a deployable object (414). As mentioned above, a deployable object is a realization of an abstract class representing the contents of the deployable application that is to be deployed in a run-time environment on an application server platform.

The method of FIG. 3 also includes querying (416) one or more of the plurality of configuration plug-ins (418) with the deployable object (414) for identifications of configuration attributes needed to perform the deployment management operation and receiving (420) from each of the queried configuration plug-ins (418) identifications (422) of configuration attributes needed to deploy the deployable object. Receiving from each of the configuration plug-ins queried with the deployable object configuration identifications of attributes needed to deploy the deployable object may be carried out by applying by the configuration plug-in attribute determination rules and determining by the configuration plug-in the attributes in dependence upon the attribute determination rules. Attribute determination rules often identify default configuration attributes and other predetermined configuration attributes necessary for deploying components of the application to be deployed.

Consider for further explanation, the following attribute determination rule for an EJB plug in:
IF plug-inType=EJB;
AND EJB resources include JavaMail Sessions;
THEN attribute needed=Application Server Email Configuration Attributes.

In the example attribute determination rule above for an EJB plug-in, if an EJB in the application to be deployed includes a resource for Java email services then the attribute determination rule dictates that the attributes needed for configuring the deployable object include the application server email configuration attributes. The email configuration attributes for the specific application server may then be identified and presented to a user to supply the specific configuration information needed for the EJB in the deployable application to invoke email resources.

The method of FIG. 3 also includes presenting (424) the identifications (422) of configuration attributes needed to deploy the deployable object (414) to a user (100). Presenting (424) the identifications (422) of configuration attributes needed to deploy the deployable object (414) to a user (100) in the example of FIG. 3 is carried out by displaying a configuration screen to a user on a graphical user interface. Such a configuration screen may be implemented as web page dynamically created to include graphical user interface ('GUI') input widgets for prompting a user for the configuration attributes needed to deploy the various modules of the web application and designed to receive through those GUI input widgets the needed configuration attributes.

The method of FIG. 3 also includes receiving (426) from the user (100) the configuration attributes (428) needed to deploy the deployable object (414). Receiving (426) from the user (100) the configuration attributes (428) needed to deploy the deployable object (414) may be carried out by receiving the configuration attributes through, for example, GUI input widgets in a dynamically created configuration screen web page.

The method of FIG. 3 also includes storing (430) the deployable object (414) and the configuration attributes (428). As discussed above, in some cases the deployable object (414) and the configuration attributes may be stored on a single deployment server. Other situations, however, may call for storing the deployable object and the configuration attributes in different locations. Storing the deployable object and the configuration attributes therefore may include storing the deployable object on a deployment server and storing the configuration object on a configuration server.

As discussed above, deployment of applications often also includes transferring the deployable object to the run-time environment. The method of FIG. 3 may therefore also include transferring the deployable object to a run-time environment on an application server.

The example of FIG. 3 focuses primarily on a single deployable object for simplicity of explanation. However, deploying an application usually includes creating more than one deployable object. That is, there is typically a one to may relationship between an application and deployable objects. For example, deploying a singe application may include creating a deployable object for an EJB and another for a WAR and so on. The method of FIG. 3 may therefore be performed more than one time during the process of deployment in accordance with the present invention.

Exemplary embodiments of the present invention are described largely in the context of a fully functional computer system for deploying an application. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method for deploying an application, the method comprising:
   receiving a packaged application for deployment and an instruction to perform a deployment management operation;
   selecting in dependence upon a programming model one of a plurality of configuration plug-ins for creating a deployable object from the packaged application;
   receiving from the selected configuration plug-in a deployable object;
   querying one or more of the plurality of configuration plug-ins with the deployable object for identifications of configuration attributes needed to perform the deployment management operation;
   receiving from each of the queried configuration plug-ins identifications of configuration attributes needed to deploy the deployable object;

presenting the identifications of configuration attributes needed to deploy the deployable object to a user;

receiving from the user the configuration attributes needed to deploy the deployable object; and storing the deployable object and the configuration attributes.

2. The method of claim 1 wherein selecting in dependence upon a programming model, one of a plurality of configuration plug-ins for creating a deployable object from the packaged application further comprises selecting a configuration plug-in in dependence upon the hierarchical relationship between the selected plug-in and one of the other plug-ins.

3. The method of claim 1 wherein receiving from each of the configuration plug-in identifications of configuration attributes needed to deploy the deployable object further comprises applying by the configuration plug-in attribute determination rules and determining by the configuration plug-in the configuration attributes in dependence upon the attribute determination rules.

4. The method of claim 1 wherein storing the deployable object and the configuration attributes further comprises storing the deployable object on a deployment server.

5. The method of claim 1 wherein storing the deployable object and the configuration attributes further comprises storing a configuration object on a configuration server.

6. The method of claim 1 further comprising transferring the deployable object to a run-time environment on an application server.

7. A system for deploying an application, the system comprising:

a computer processor;

a computer memory operatively coupled to the computer processor, the computer memory having disposed within it computer program instructions capable of:

receiving a packaged application for deployment and an instruction to perform a deployment management operation;

selecting in dependence upon a programming model one of a plurality of configuration plug-ins for creating a deployable object from the packaged application;

receiving from the selected configuration plug-in a deployable object;

querying one or more of the plurality of configuration plug-ins with the deployable object for identifications of configuration attributes needed to perform the deployment management operation;

receiving from each of the queried configuration plug-ins identifications of configuration attributes needed to deploy the deployable object;

presenting the identifications of configuration attributes needed to deploy the deployable object to a user;

receiving from the user the configuration attributes needed to deploy the deployable object; and storing the deployable object and the configuration attributes.

8. The system of claim 7 wherein computer program instructions capable of selecting in dependence upon a programming model one of a plurality of configuration plug-ins for creating a deployable object from the packaged application further comprise computer program instructions capable of selecting a configuration plug-in in dependence upon the hierarchical relationship between the selected plug-in and one of the other plug-ins.

9. The system of claim 7 wherein computer program instructions capable of receiving from each of the configuration plug-in identifications of configuration attributes needed to deploy the deployable object further comprise computer program instructions capable of applying by the configuration plug-in attribute determination rules and determining by the configuration plug-in the configuration attributes in dependence upon the attribute determination rules.

10. The system of claim 7 wherein computer program instructions capable of storing the deployable object and the configuration attributes further comprise computer program instructions capable of storing the deployable object on a deployment server.

11. The system of claim 7 wherein computer program instructions capable of storing the deployable object and the configuration attributes further comprise computer program instructions capable of storing a configuration object on a configuration server.

12. The system of claim 7 wherein the computer memory also has disposed within it computer program instructions capable of transferring the deployable object to a run-time environment on an application server.

13. A computer implemented computer program product for deploying an application, the computer program product embodied on a computer-readable non-transmission medium, the computer program product comprising:

computer program instructions for receiving a packaged application for deployment and an instruction to perform a deployment management operation;

computer program instructions for selecting in dependence upon a programming model one of a plurality of configuration plug-ins for creating a deployable object from the packaged application;

computer program instructions for receiving from the selected configuration plug-in a deployable object;

computer program instructions for querying one or more of the plurality of configuration plug-ins with the deployable object for identifications of configuration attributes needed to perform the deployment management operation;

computer program instructions for receiving from each of the queried configuration plug-ins identifications of configuration attributes needed to deploy the deployable object;

computer program instructions for presenting the identifications of configuration attributes needed to deploy the deployable object to a user;

computer program instructions for receiving from the user the configuration attributes needed to deploy the deployable object; and computer program instructions for storing the deployable object and the configuration attributes.

14. The computer program product of claim 13 wherein computer program instructions for selecting in dependence upon a programming model one of a plurality of configuration plug-ins for creating a deployable object from the packaged application further comprise computer program instructions for selecting a configuration plug-in in dependence upon the hierarchical relationship between the selected plug-in and one of the other plug-ins.

15. The computer program product of claim 13 wherein computer program instructions for receiving from each of the configuration plug-in identifications of configuration attributes needed to deploy the deployable object further comprise applying by the configuration plug-in attribute determination rules and determining by the configuration plug-in the configuration attributes in dependence upon the attribute determination rules.

16. The computer program product of claim 13 wherein computer program instructions for storing the deployable object and the configuration attributes further comprise computer program instructions for storing the deployable object on a deployment server.

17. The computer program product of claim 13 wherein computer program instructions for storing the deployable object and the configuration attributes further comprise computer program instructions for storing a configuration object on a configuration server.

18. The computer program product of claim 13 further comprising computer program instructions for transferring the deployable object to a run-time environment on an application server.

* * * * *